United States Patent [19]

St. Clair

[11] 4,027,523

[45] * June 7, 1977

[54] METHODS AND APPARATUS FOR PROOF TESTING GAS METERS

[75] Inventor: Theodore A. St. Clair, Fairfield, Conn.

[73] Assignee: Textron, Inc., Providence, R.I.

[ * ] Notice: The portion of the term of this patent subsequent to Feb. 10, 1993, has been disclaimed.

[22] Filed: Nov. 12, 1975

[21] Appl. No.: 631,498

[52] U.S. Cl. .................................................. 73/3
[51] Int. Cl.² .................................... G01F 25/00
[58] Field of Search ......................................... 73/3

[56] References Cited

UNITED STATES PATENTS

| | | | |
|---|---|---|---|
| 1,023,739 | 4/1912 | Joyce | 73/3 |
| 1,422,089 | 7/1922 | Dezendorf | 73/3 |
| 3,937,048 | 2/1976 | St. Clair et al. | 73/3 |

*Primary Examiner*—S. Clement Swisher
*Attorney, Agent, or Firm*—Arthur A. Johnson

[57] ABSTRACT

There is disclosed herein methods and apparatus for proof testing fluid meters, particularly gas meters of the positive displacement, diaphragm-operated type in which the number of cycles of operations of the valve mechanism of the meter is used as a factor in proving the accuracy of the meter, the number of said cycles being determined by sensing a series of pressure waveforms in the test gas entering and leaving the diaphragm chambers of the meter, which waveforms are characteristic of the particular meter being tested and occur in each cycle and reoccurring cycle of operation of the meter when operating, detecting a characteristic waveform in each series of waveforms, amplifying and shaping the characteristic waveform and counting a predetermined number of cycles of said waveforms and comparing the volume of test gas which has passed through the meter as measured by a meter prover with the amount that should have passed during that predetermined number of cycles of operations of the meter. In the embodiment herein disclosed, the proving of the meter is carried out by maintaining a predetermined constant rate of flow of the test gas through the meter as by placing a sonic nozzle, a critical flow orifice or the like in the path of the test gas, such as air, which passes through the meter being tested for a measured length of time whereby the volume of the test air which actually passed through the meter may be determined to establish the proof of the meter.

7 Claims, 16 Drawing Figures

METHODS AND APPARATUS FOR PROOF TESTING GAS METERS

This invention relates to improvements in methods and apparatus for proving the accuracy of positive displacement, diaphragm-operated fluid meters and more particularly to gas meters of that type.

In copending application Ser. No. 529,947, filed Dec. 5, 1974, assigned to the assignee of this application, there are disclosed methods and apparatus for proof testing gas meters by volumetrically measuring the amount of test gas passing through the meter, and determining the number of cycles of operation of the metering means of the meter during a test run by sensing pressure fluctuations in the test gas passing through the meter, the specific method and means disclosed in said application for determining the proof of the meter being based on volumetric displacement of the test air, as in a test bell, for instance.

In the present application there are disclosed and claimed methods and means for proof testing a gas meter in which the volume of the test gas passing through the meter is determined by controlling the rate of flow of the test air passing through the meter during a test run lasting for a predetermined period of time. Such rate of flow may be effected by means of sonic nozzle or critical flow orifice means, or instance, through which the test air passing during a test run.

One of the advantages of the flow rate method of proof testing a gas meter, according to the embodiments of the invention herein disclosed, is that the time required to make the proof test can be substantially shortened with the attendant saving in the cost of making the test.

Another advantage is that the apparatus required to obtain the improved results in simple and more easily transported, so that proof testing can be conveniently performed at the location where the meter to be tested is installed or is to be installed.

A further advantage obtained by the use of the flow rate method of meter proofing, provided in the present invention, is that the valving of the test air is substantially simplified and, therefore, does not occupy much space and is not likely to get out of order.

The test gas passing through the meter, in the broader aspects of this invention, may be produced by a force or suction pump or the like, the latter being shown and described herein by way of example.

Other features and advantages will hereinafter appear.

Figures 1, 1A:
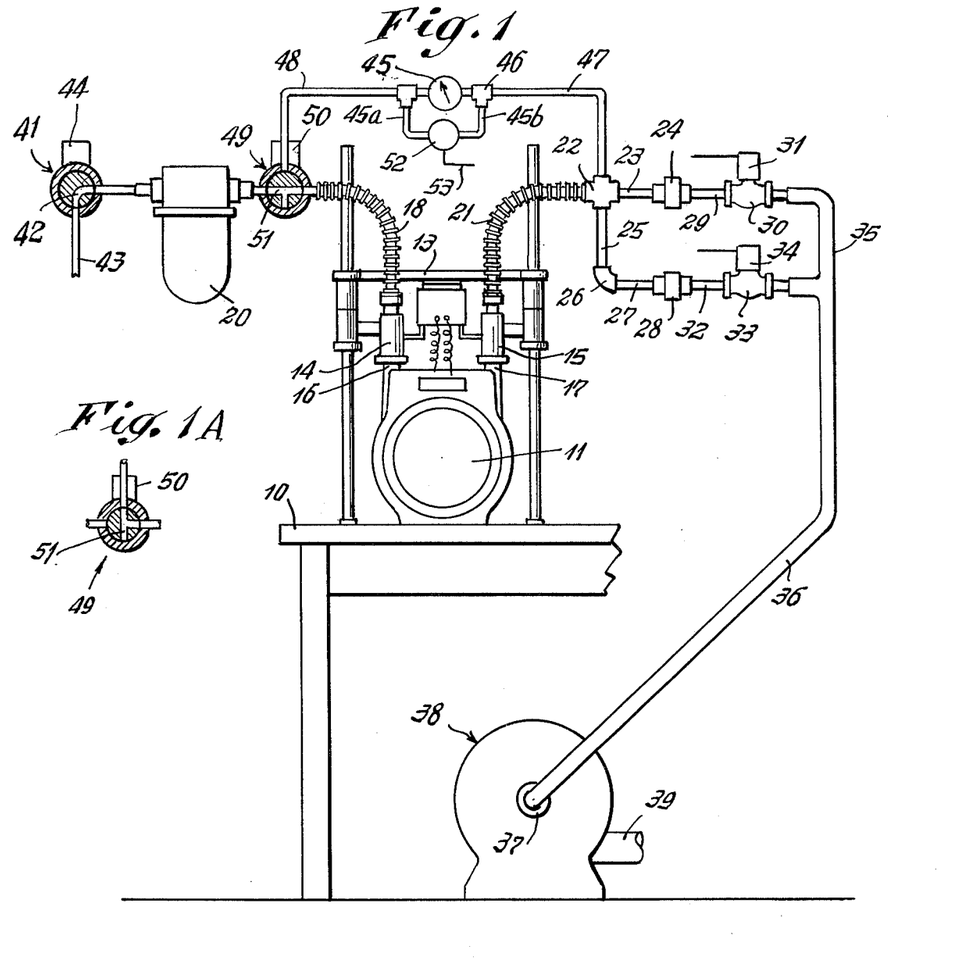
FIG. 1 is a schematic view of the arrangement of the proof testing apparatus of the present invention using flow rate control means to determine the volume of test air actually passing through the meter during a test run, showing by way of example, the connections for flowing test air into and through the meter and through the flow rate control means for both an Open and a Check test run, and means for testing the connections to the meter for leakage.
FIG. 1a is a sectional view of the leak test valve in leak proof testing position.

As shown in the accompanying drawings, FIG. 1 shows a test stand 10 having a top surface for supporting a meter 11 and vertical supports 12 on which is slidably mounted an adapter 13 having intake fitting 14 and outlet fitting 15 which fit over and make airtight connection with inlet 16 and outlet 17 of a gas meter to be proof tested when the meter is positioned and the adapter 13 is placed in position on the meter.

The intake fitting 14 is connected by a flexible test air intake tube 18 leading to an air cleaner 20 suitably mounted in convenient position. The outlet fitting 15 is connected, in the arrangement shown in FIG. 1 by way of example, by a flexible tube 21 to a fitting 22, one branch of which is connected by a duct 23 to a flow rate controller 24, while another branch of the fitting 2 is connected by a duct 25, el 26 and duct 27 to a flow rate controller 28.

Figure 2:
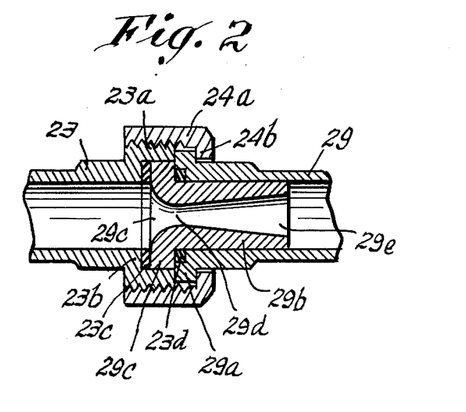
FIG. 2 is a longitudinal section showing a flow rate control comprising a sonic nozzle which is interposed between the duct leading from the meter, and the conduit means leading to a suction pump.
Figure 3:
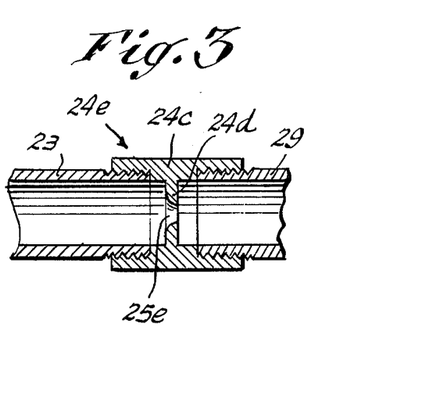
FIG. 3 is like FIG. 2, but shows a critical flow orifice flow rate control.

The flow rate controls 24 and 28 may be in the form of sonic nozzles shown in FIG. 2, or critical flow orifices shown in FIG. 3. The flow rate controller 24 is connected by a duct 29 to a normally closed "Open" test valve 30 opened by a solenoid 31, while the flow rate controller 28 is connected by a duct 32 to a normally open Check test valve 33 closed by a solenoid 34. The outlets of the valves 30 and 33 are connected to a manifold 35 which is connected by an air duct 36 to the intake 37 of a vacuum pump 38 exhausting to the atmosphere through pipe 39. The air cleaner 20 is connected to an operate valve 41 having a passage 42 leading to the air intake pipe 43 and is operated by solenoid 44.

Prior to testing the meter for performance, in order to insure that the inlet and outlet fittings 14 and 15 are seated gastight against the meter inlet 16 and outlet 17 respectively, a pressure gauge 45 is provided. One side of the pressure gauge is connected by a fitting 46 to a duct 47 and the fitting 22 which communicates with the flexible hose 21 connected to the outlet side of the meter. The other side of the pressure gauge 45 is connected to a duct 48 to a three-way leak-test valve 49 which may be biased to meter testing position shown in FIG. 1 and moved to leak testing position shown in FIG. 1a by a solenoid 50, in which the passage 51 allows test gas to flow from the air cleaner 20 to the intake hose 18 and into the meter when the suction pump 38 is operating. This occurs when the operate valve 41 is in the FIG. 1 position and the pump 38 is applying suction to the air being drawn through the meter reducing the air pressure in the pressure gauge 45 and the meter 11.

When the leak test valve 49 is rotated counterclockwise, to the position shown in FIG. 1a by the solenoid 50, the passage 51 causes air to be trapped (the normally open Check test valve 33 being closed and the normally closed Open test valve 30 closed) between opposite sides of the flexible connections 18 and 21, fittings 14 and 15 and the meter, provided the connections are gastight.

If the connections to themeter are gastight, the gauge 45 will hold steady. But, if there is any leakage in the connections between the fittings 14 and 15 and the meter, for instance, the pressure of the trapped air will increase and this will be indicated by the gauge 45 which may be visibly observed. However, to avoid the necessity of the tester watching the gauge 45, a pressure-operated switch 52 connected to the gauge 45 by the ducts 45a and 45b is set to open a circuit, including lead 53 as pointed out below. When the air pressure increases above a predetermined value, the meter testing operation will be aborted until the leak has been discovered and eliminated.

If there is no leakage, the test proceeds by making an Open test run. This is accomplished by causing both the valves 30 and 33 to be open so that the test air will flow through both valves, the flow rate control 24 and the flow rate control 28. In making the Check test run, the normally closed Open test valve 30 is closed and the normally open Check test valve 33 is open so that the test air will follow only through the Check test valve 33, thereby reducing the volume of the test air flowing through the meter.

In said prior application above noted, the volume of test air passing through the meter in each of the several tests is determined by measuring the test air by the bell method. However, I have found that said method of electronically proofing a gas meter can be performed with equal and possibly greater facility using the constant flow rate method of proof testing which has the additional advantage of being performed with readily portable apparatus permitting meters to be tested wherever located.

Constant flow rate proofing is similar to the bell method of proofing a meter in that the volume of test air passing through the meter is measured against the volume which properly should have passed through the meter during the test. In the bell-type proofing as disclosed in said prior application, the volume of test air is measured by the amount of movement of the proofing bell, while in the constant flow rate method of proofing, disclosed herein, the volume of air passing through the meter is determined by measuring the time required to flow the air through the meter, the volume actually passing through the meter being determined by the flow rate controllers 30 and 33. The flow rates being known in advance, the volume can be determined by the timing means.

In the broader aspects of this invention any suitable means for operating the valves above referred to in proper sequence may be used, for instance the electromechanical valve sequence apparatus shown in U.S. Pat. No. 3,035,434. However, as will appear below, the time required for conducting the tests was substantially reduced by the method and apparatus of the invention as described and claimed in said prior application Ser. No. 529,947, filed Dec. 5, 1974, now U.S. Pat. No. 3,937,048 that the time saved thereby would be substantially lost if the method and electromechanical apparatus of said patent were employed to control the sequence of the operations in the tests.

Hence, an important feature of this invention is the provision of means similar to that disclosed in said prior application for patent for sequentially initiating and performing the various functions in testing a gas meter including the opening and closing of the various valves between the atmosphere and the meter on the one hand and between the meter and the suction pump on the other hand.

Figure 12:
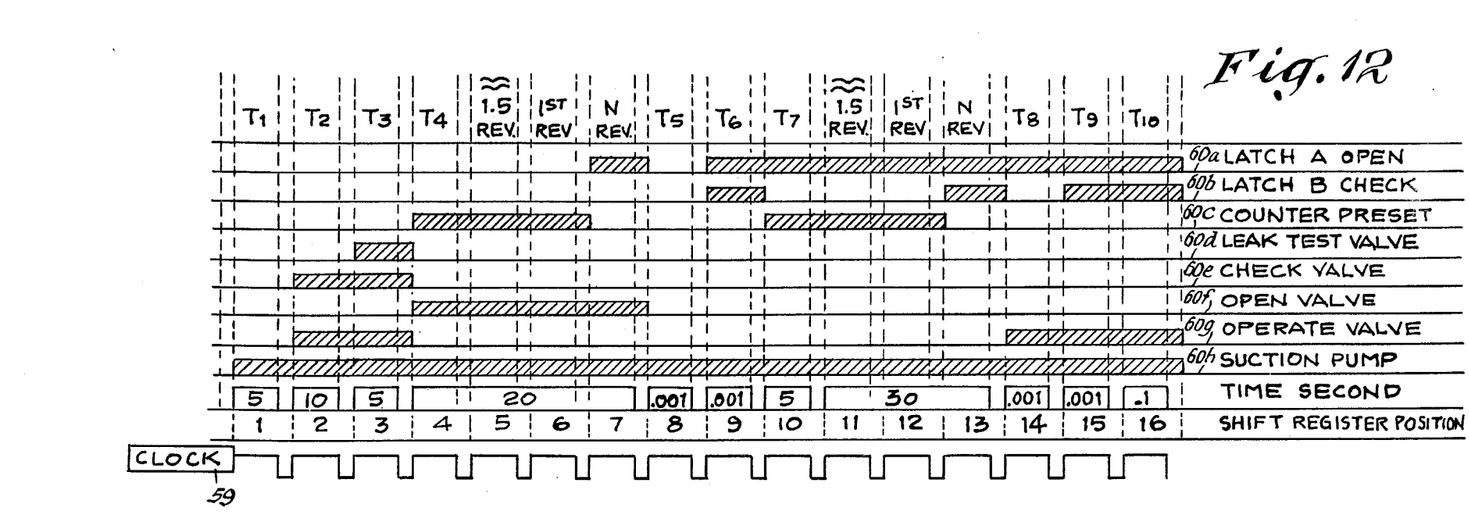
FIG. 12 is a fuction timing diagram showing the functions to be performed in the 16 steps of a shaft register in making an Open test run and a Check test run, and indicating, by way of example, the length of the respective time periods in which several of the function operations are performed under the control of the shift register.
Figure 13:
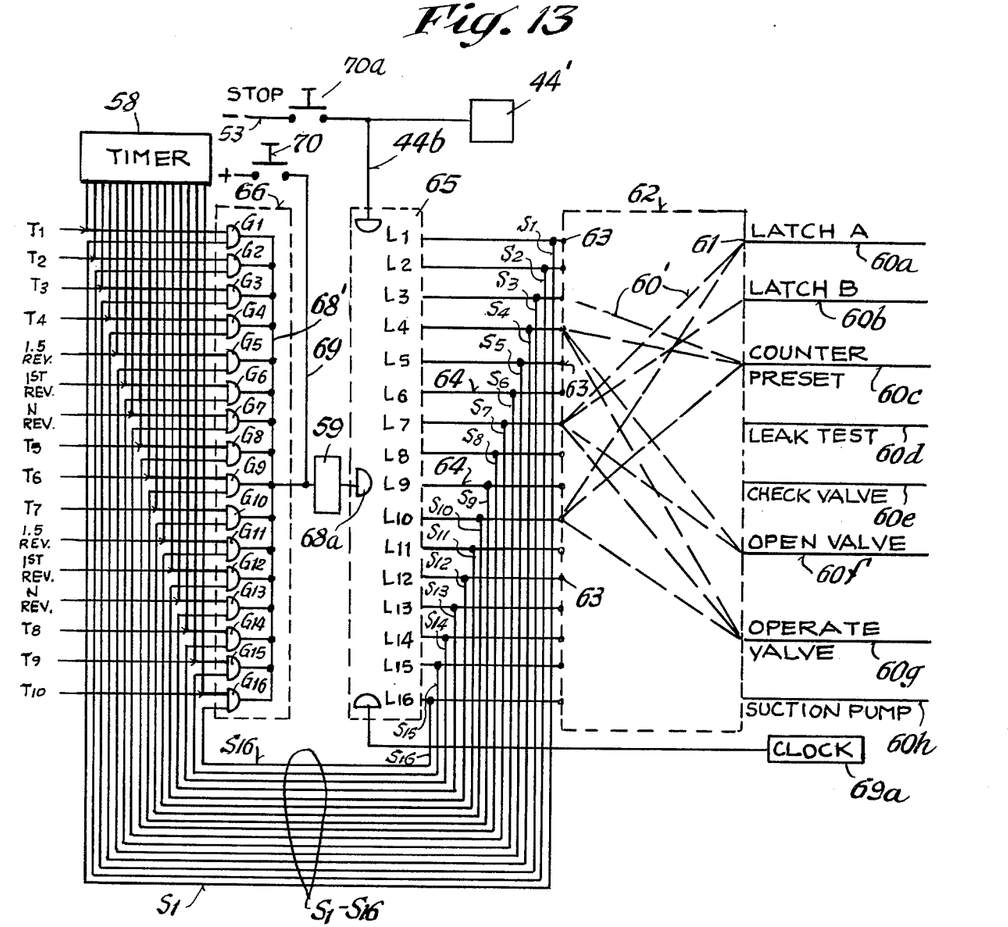
FIG. 13 is a diagrammatic view showing the function selectors, the function operating circuits, the shift register and the malfunction detecting circuits.
Figure 14:
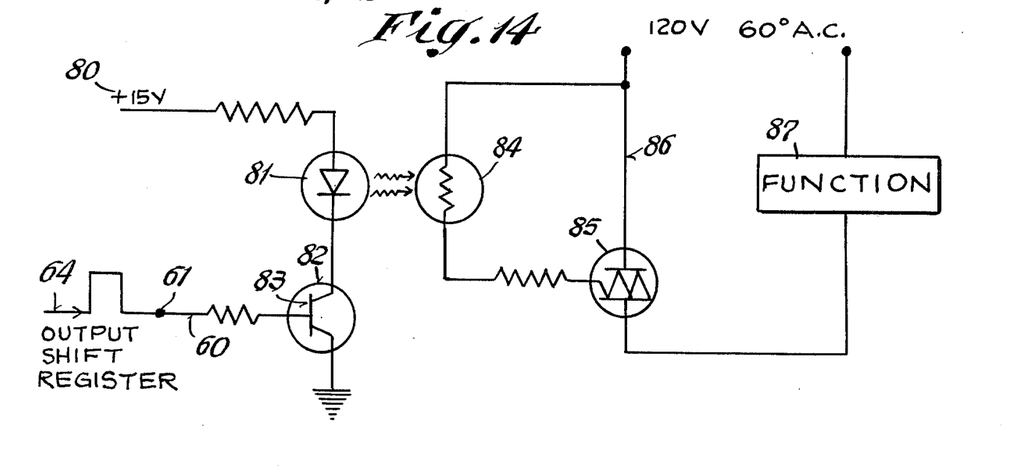
FIG. 14 is a schematic view of one form of drive circuit responsive to a signal from the shift register to initiate the operation of one of the function performing means.

As disclosed herein, the means for performing the functions required in connection with testing a meter according to the present invention comprises a timer 58, diagrammatically illustrated in FIG. 13, a clock 59 which acts to step a shift register 65, and a plurality of function performing drive circuits 60a to 60h (see FIGS. 12 and 13), one of which is shown by way of example in FIG. 14.

The circuits 60a and 60h are connected to outlets 61 of a function selector 62 which may comprise a diode matrix having inlets 63 connected by leads 64 to outlets L1 to L16 inclusive of the 16 stage shift register 65.

Before proceeding with the description of the function selection and operation, attention is called to FIG. 12 which is a function timing diagram indicating the functions to be performed by the driving circuits 60a to 60h and showing in vertical columns the sixteen steps of the shift register 65 shown in FIG. 13. The steps represented in FIG. 12, except the 5th, 6th, 7th, 11th, 12th and 13th, are controlled by the timer 58 and are identified by the time periods T1 and T10.

In step 1 (T1), the suction pump motor 38 is started.

In step 2 (T2), the normally open operate valve 41 is closed and the normally closed Open test valve 30 remains closed, and the normally open check test valve 33 is closed—the air in the meter and its connections being at sub-atmospheric pressure.

In step 3 (T3), the leak test valve 49 is moved to the position shown in FIG. 1a and the normally open operate valve 41 remains closed. If the connections 14 and 15 leak the air pressure in the meter will increase and the switch 52 will be operated and the test aborted by opening lead 53 to the stop switch 70a.

In step 4 (T4), if no leakage has been detected, the leak test valve 49 returns to the position shown in FIG. 1, connecting the air intake duct 43 through the operate valve 41 and air cleaner 20 and leak test valve 49 to the intake side of the meter. The counter is preset to zero and the normally closed Open test valve 30 opens.

In step 5 (1.5 Rev), the conditions of step 4 continue, allowing the perturbation of the transducer, caused by the opening of the check valve 33, to decay.

In step 6 (1st Rev), the conditions of steps 4 and 5 continue and the peak detecting circuitry recognizes at least one complete revolution of the meter valve mechanism prior to the counting of the revolutions in making the test. This is accomplished by counting clock pulses.

In step 7 (N. Rev), the operation of detecting the peak pressure fluctuations which occur in the meter takes place, as will be explained below, the preset counter circuit 60c is disabled. At the same time latch A for the Open test optical display 125 is enabled and latch B for the Check test optical display 125' remains disabled, see FIGS. 12 and 12a, by the leads 60a and 60b disabling the gates G and G' respectively.

The period in which the actual Open test is made, i.e., steps 4, 5, 6 and 7, lasts for about 20 seconds during which the cycles of the meter valve mechanism are taking place and being counted by the cycle counter 111.

At the end of step 7 (N. Rev), i.e., the beginning of step 8 (T5), the normally closed Open test valve 30 closes and remains closed for the remainder of the test.

In step 9 (T6), the counter readout takes place and the latches A and B being enabled, by the circuits 60a and 60b respectively, and gates G1 and G2 to transfer the count from the counter and totalizer 122 to the optical displays 125 and 125' respectively, and that is the end of the Open test.

In step 10 (T7), the latch B is again disabled and the counter preset is enabled.

In step 11 (1.5 Rev) and step 12 (1st Rev), the conditions remain the same as in step 10.

At the beginning of step 13 (N. Rev), the latch B is enabled by closing the circuit 60b and the counter preset is disabled.

In step 14 (T8), the operate valve 41 is closed and remains closed for the remainder of the test, the latch B is disabled and the latch A remains enabled so that the count of the Check test can be transferred to the optical display 125'.

During step 15 (T9) and step 16 (T10), the latch A and the latch B remain enabled.

From FIG. 12 which shows the approximate time period for each step, it will be seen that the operation of testing for leaks, making the Open test and making the Check test according to the present invention occupies approximately 76 seconds as against 4 minutes required heretofore to make the same kinds of tests.

It should be noted here, the purpose of the test being to compare the performance of the meter with an established optimum degree of accuracy, that any disparity between the optimum performance and that actually performed during the test can be discovered by comparing the volume of test gas delivered during the predetermined number of cycles of operations of the meter with a known standard volume for which the meter was constructed.

It has been found advantageous to operate the test for a determinate number of cycles of operations of the valve mechanism of the meter. To this end means are provided for terminating the test when the meter has made a predetermined number of cycles of operation and comparing the volume displayed by the optical displays 125 and 125' against a known standard volume.

As stated above, and as shown in FIG. 13, the drive circuits 60a to 60h are energized by the function selector 62 which is preset to connect the desired function drive circuit or circuits 60' which are activated in the various stages of the shift register 65 which has 16 stages corresponding to the 16 steps of the timer 58, the steps of which are represented by the diagram, FIG. 12.

To start the cycle, a starter switch 70 connected to a positive current source, +, is employed. Starter switch 70 is initially in closed position. Opening the switch 70 causes a surge of negative current to pulse into stepper terminal 68a via lead 69. Shift register 65 which is reset after each completed cycle (and thus reset before each new cycle) receives the step signal and energizes (turns on) output terminal L1. The ON signal of L1 is transmitted simultaneously to function selector 62 by lead S1. The signal from S1 enters AND gate G1 together with input T1. Timer 58, as shown in FIG. 12, keeps T1 ON for approximately 10 seconds. Gate G1 has an ON output as long as L1 via S1 and T1 are both ON. The ON output from AND gate G1 has no effect on stepper terminal 68a which steps the shift register only when it senses a negative pulsed signal. L1 will remain ON. When timer 58 turns T1 OFF after 10 seconds, AND gate G1 turns OFF. This causes a clock 59 to pulse the negative current to stopper 68a which shifts the shift register 65 to the position of output terminal L2 from output terminal L1. L2 is now ON; L1 is now OFF. The L2 signal follows a sequence similar to that of L1. This step-shifting continues until output terminal L16 is turned ON at which point the system stops and resets to the L1 position. L1 through L16 will thus be energized in seriatim for predetermined time periods T1 to T10 (set by timer 58) and for variable controlled periods 1.5 Rev, 1st Rev, N, Rev in the Open test and 1.5 Rev, 1st Rev, N. Rev in the Check test.

The output terminals L1 to L16 of the shift register 65 are connected by circuits 64 to input terminals 63 of the function selector 62. However, the shift register circuits 64 are not energized unless the step of the timer 58 is in the same step as the shift register 65.

For this purpose the present invention provides a malfunction preventing arrangement in which shift register output circuits 64 are respectively connected by leads S1 to S16, each leading to a related AND gate G1 to G16 of ganged AND gate network 66 connected respectively to leads T1, T2, T3, T4, leads marked 1.5 Rev. 1st Rev, N. Rev, T5 to T8, leads marked 1.5 Rev, 1st Rev, N. Rev, and leads marked T9 to and T10 (FIG. 13). The outputs of the AND gates G1 to G16 are each connected to a common lead 68'. Hence, when an AND gat is made conductive, the companion circuits 64 from the shift register 65 are energized and the related function is or functions are performed.

This arangement prevents malfunctioning in the following way. If the timer 58 skips a step, no input to the function selector 62 will occur. For example, if the timer 58 goes to T3 from T1, AND gate G1 will turn OFF and stepper terminal 68a will shift the shift register 65 to L2. One input then to AND gate G2 will be carrying a signal (from L2 via S2) and only one input to AND gate G4 (from T3) will be present. Neither gate G2 nor gate G4 will be conducting. The system will be stopped. Also, if T2 is erroneously energized while L1 and T1 are ON, G1 will remain ON, as will L1. Because L2 must be OFF when L1 is ON, no signal will travel via S2 to AND gate G2. G2 will remain OFF and the function selector 62 will receive no signal from output terminal L2. Only functions connected to output terminal L1 will be energized.

In essence, the malfunction arrangement of FIG. 13 requires that there be an ordered cycle of selected functions. L2, the output terminal to function selector 62 will not remain ON unless timer 58 has turned T2 ON. If T2 is OFF, L2 is OFF. And, conversely, as shown in the examples above, where the timer 58 is in error in the time sequencing, there will be no output terminal errors.

After the cycle is completed, the terminal 68a of the reset circuit of the shift circuit 65 is energized and the shift register is returned to starting condition in which it remains until the starter switch 70 is again operated.

It should be understood that the lines 60a to 60h shown in FIG. 13 between the shift register terminals L2, L3, L4, L7 and L16 and the related function driving circuit terminals 63 are representative of the manner in which the other companion terminals are interconnected and that the connection lines of several of the other circuits are omitted merely to avoid confusion.

In the form of the invention herein illustrated by way of example, there are only eight function drive circuits 60a to 60h while there are 16 time periods and shift register stages. This is because several of the functional operations extend over several time steps as indicated by the leads 60' in FIG. 13.

The duration of each of the time steps is controlled by the timer 58 except for steps 5, 6, 7, 11, 12 and 13 which are terminated by the shift register going to the step 6 when the first significant signal is received from the pulse sensing means referred to below. Likewise in the step 7 of the time controlled function selector 62, the valve mechanism makes N revolutions. Steps 8 and 9 are of short duration and are passed through substantially instantaneously. Step 7 marks the end of the Open test while step 9 disables the latch A to display the count in the counter and totalizer 122 of the result of the Open test. In step 10 the revolution counter is enabled to terminate the Check test when the meter valve mechanism has made a predeterminate number of cycles of operation.

At this point it may be noted that in the broader aspects of this invention any suitable drive circuit may be employed to furnish the power for performing the functions. However, it has been found that an electronic relay is best suited for the purpose. Such a relay is shown in FIG. 14 in which the output of the function selector 62 for each of the function performing devices may comprise a D.C. source 80 of low voltage fed to a luminous diode 81 and transistor 82 to ground. The base 83 of the transistor 82 is connected to one of the function leads 60. The light from the diode 81 impinges on a photodetector 84 which enables a triac gate 85 in an A.C. power circuit 86 connected to and energizing the function performing device represented by block 87.

As stated above, an object of this invention is to improve the methods and means for proving positive displacement, diaphragm-operated gas meters. Such meters are provided with valve mechanism for controlling the flow of gas from the inlet through the displacement chambers to the service outlet. The valve mechanism operates means know as a tangent which drives the index mechanism and which is adjustable and must be adjusted if the proof of the meter is not accurate in both an Open test and a Check test run. This adjustment is made by inserting a wrench through a normally plugged hole in the meter and turning appropriate screws.

Prior to the invention disclosed in said prior application Ser. No. 529,947, proof of a meter was heretofore determined by operating the meter so the index indicated a finite volume and comparing this with the actual volume simultaneously passing through the meter as measured by a bell prover.

It usually requires the flow of 2 cubic feed of test air through the meter to provide in the prior method of testing, and this would take about 4 minutes, whereas with the method and apparatus disclosed herein and in said application, only a small fraction of that time is required to make the tests. This is because it is not necessary to depend upon the index of the meter to obtain a reading and only a fraction of the amount of test air is required to complete the tests. By interposing between the inlet and outlet ports of a meter a voltage transducer, in each cycle of operation of the meter under test, due to the valve action of the meter, the air pressure between the inlet port and the outlet port of the meter fluctuates so that one or more voltage peaks are produced and reproduced in each reoccurring cycle of the valve mechanism and diaphragms, each cycle passing an identical volume through the meter. The pattern of the voltage peaks is substantially the same for each meter of the same size and class. Stated differently, all meters of the same size and style made by a manufacturer will produce essentially the same pattern of voltage in each cycle of operations of the meter.

Accordingly in the form of the invention herein disclosed, the test run is terminated when the meter valve mechanism has made a predetermined number of cycles of operation, and the meter displaced volume compared with the actual volume of test air as measured by a flow prover device.

As in said prior application Ser. No. 529,947, the number of cycles of operation of valve mechanism in the meter in a test run is determined electronically by sensing a series of pressure fluctuations formed in the test gas entering and leaving the diaphragm chambers of the meter, which wave forms are characteristic of the particular meter being tested and occur in eacy cycle and reoccurring cycle of the operation of the valve mechanism of the meter when operating, detecting one or more characteristic wave forms, counting a predetermined number of wave forms and comparing the volume of test air which passed through the meter with the amount that should have passed during a predetermined number of cycles of operation of the meter.

In the invention disclosed herein, reliance is also placed on the sensing of said characteristic wave forms and converting them into voltages which may be used to determine the number of cycles of operation of the valve mechanism of the meter taking place during the proofing test.

Figures 4, 5, 6, 7, 8, 9, 10, 11:
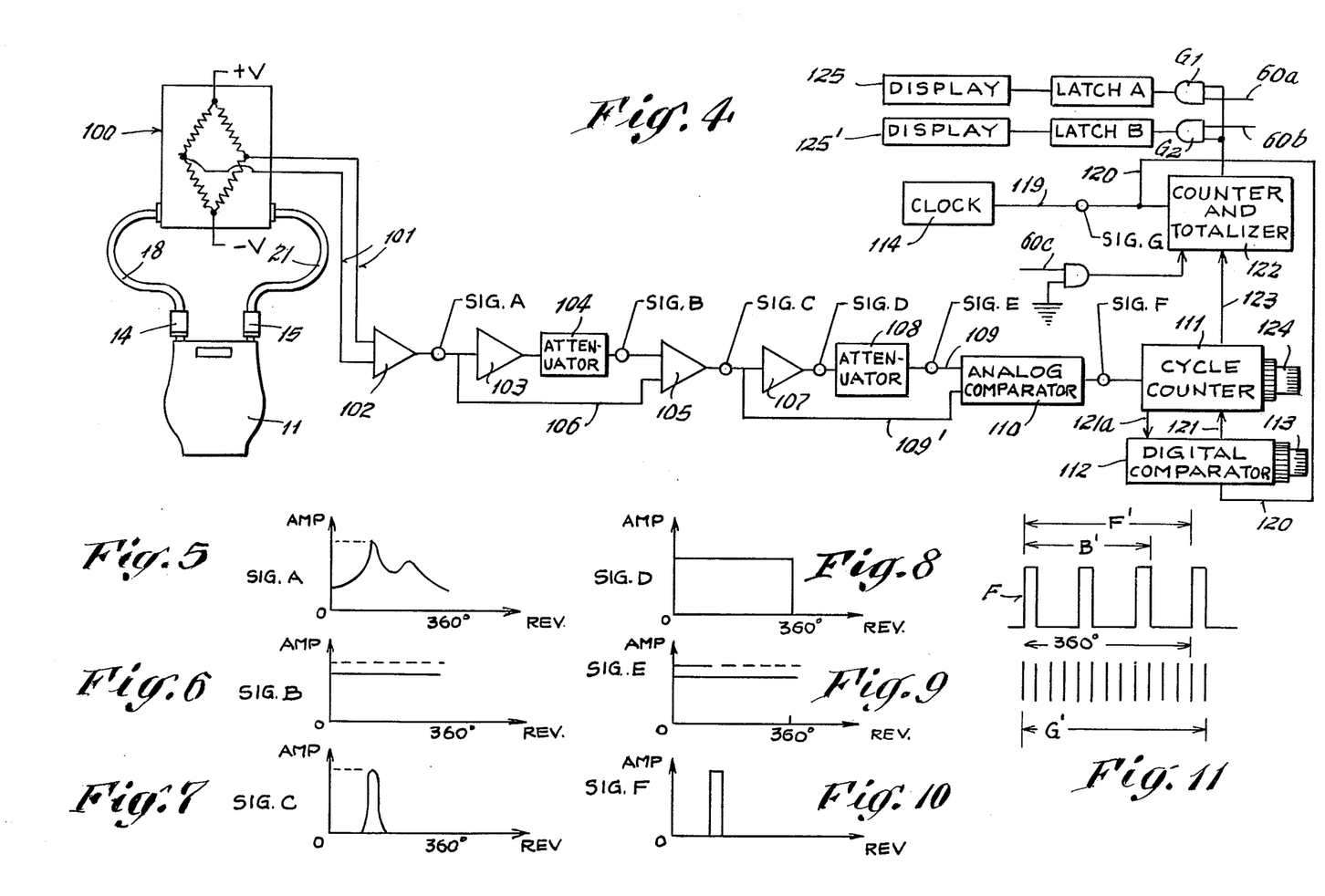
FIG. 4 is a schematic view showing the relationship between the gas meter and a transducer and the components for amplifying and shaping the waveform of the signals received from the transducer including the volume encoder, the cycle counter, the counter and totalizer and the digital comparator.
FIG. 5 is a graph of a representative amplified train of pressure signal waveforms issuing from the transducer in one cycle of operation of the valve mechanism, of the meter being proof tested.
FIG. 6 shows the signal waveform peak detected and attenuated.
FIG. 7 shows the waveform of the signal after it has passed through the second differential amplifier.
FIG. 8 shows the peak detected signal.
FIG. 9 shows the approximate shape of the peak signal after peak voltage level has been lowered.
FIG. 10 shows the final shape of a waveform as it leaves the analog comparator.
FIG. 11 represents the waveform of the signals leaving the analog comparator in one cycle of operation of the valve mechanism of the meter and the signal received by the digital comparator from the volume encoder.

For this purpose, as shown in FIG. 4, the sampling circuit comprises a transducer 100, which may be of the resistance bridge type, which is connected by flexible tubes 18 and 21, for instance, to the fixtures 14 and 15, see FIG. 1, which engage the inlet and outlet ports respective of the meter.

The fluctuations of the test air pressure caused by operation of the valve mechanism of the meter which are applied to a transducer 100, during the operation of the meter under test, results in a series of electrical signals of varying voltage being fed through the leads 101 to a differential amplifier 102 which increases the voltage level of the signals received from the transducer 100 to usable strength to provide a signal A schematically shown in FIG. 5. The signal A is fed to a peak detector 103 which sends a signal to an attenuator 104 which produces and maintains the signal B at a level of voltage equal to a fraction of the maximum amplitude of the undulating signal at its input terminals as shown in FIG. 6.

From the attenuator 104 the signal B is passed to a second differential amplifier 105 which also receives a signal A via lead 106 from the first differential amplifier 102 and amplifies the difference between the signals A and B. The resulting signal C (see FIG. 7) is fed to a second peak detector 107 which passes a signal D (see FIG. 8) to a second attenuator 108.

As illustrated in FIG. 9, the attenuator 108 lowers the level of voltage response to accommodate signals having peak levels which vary slightly from the greatest peak of each of the cycles of operations of the meter.

Signals E from the second attenuator are fed via lead 109 to analog comparator 110 which at the same time receives a signal C via line 109' from the differential amplifier 105. When the amplitude of the signal C exceeds that of the signal E the signal F is produced.

Since there may be more than one peak voltage signal occurring in eacy cycle of operations of the meter depending on the construction and mode of operation of the meter being tested, the output of the analog comparator 110, as shown in FIG. 11, may consist of a plurality of peak voltage signals F for each cycle of operations of the meter. However, in testing another meter of different make or size, there may be a different number of peak voltage signals per revolution.

From the analog comparator 110, signals F are fed to a cycle counter 111 and if there are more than one signal F, produced in a cycle of operations, without providing for this, the reading of the cycle counter would be false. Therefore, to permit the same test equipment to be used for different makes or sizes of meters, the present invention provides for feeding signals from a digital comparator 112 which prevents more than one signal F per revolution of the valve mechanism from being recorded in the cycle counter 111. For the purpose of permitting the passage of only one of said plurality of signals F' to the cycle counter 111, the digital comparator 112 has a manually adjustable knob 113 which can be set by the operator according to the known number of volume controlled signals that are produced in the particular meter being tested in each cycle of the meter.

Figure 12A:
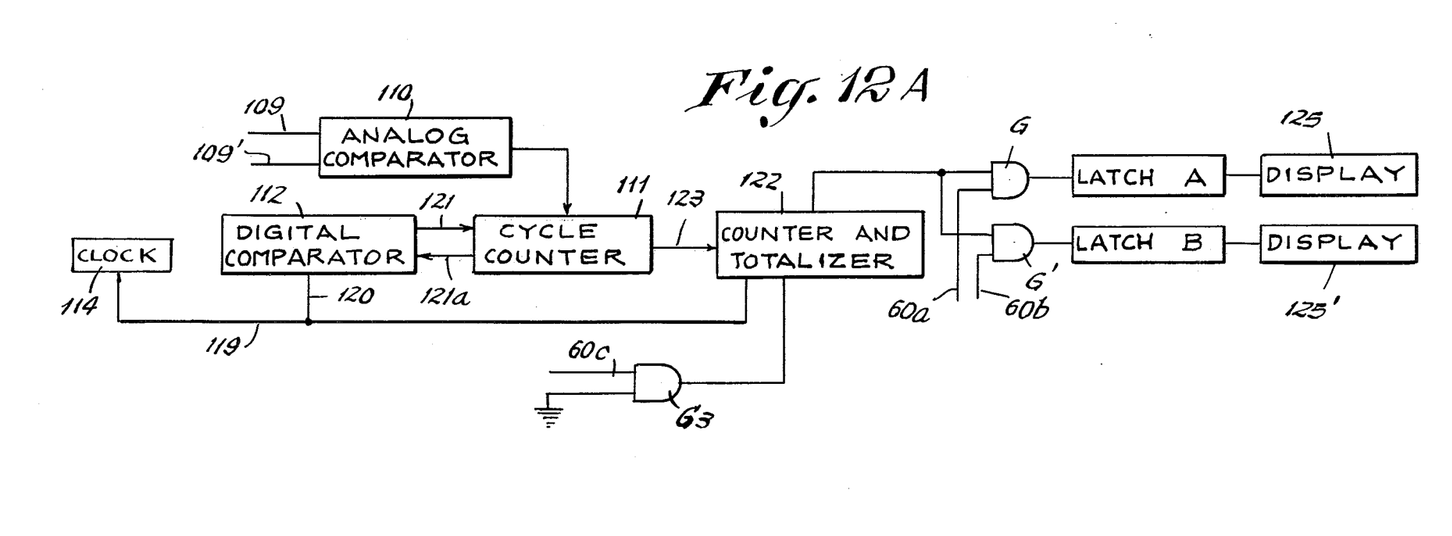
FIG. 12a is a diagrammatic view showing the relationship between the various elements shown in FIGS. 4 and 12 leading to the display devices.

To determine the volume of test gas which has passed through the meter during the test, there is provided in the present form of the invention a clock 114, see FIGS. 4 and 12a, which is stopped when a predetermined number of complete rotations of the valve mechanism of the meter has taken place.

For this purpose the clock 114 is started, as pointed out below, when the counting of the cycles of operations of the valve mechanism begins and is stopped when the counting ends at the end of the Open test. The clock 114 is started again at the beginning of the Check test and is stopped at the end of the Check test.

When the clock 114 which times the length of each test run and hence the volume of test gas which passed through the meter stops, a signal is passed via lines 119 and 120 to the digital comparator 112.

In the embodiment of my invention disclosed herein, when the number of signals G, as predetermined by the position of the settable control knob 113, are received by the digital comparator 112, the cycle counter 111 via lead 121 is enabled to accept from the analog comparator 110 one signal F of the group of signals F'.

The cycle counter 111 is connected to the combined counter and totalizer 122 by lead 123. When a predetermined number of signals F has been received by the cycle counter 111, which number is determined by setting adjustable knob 124, the counting operation is stopped.

Each time that the cycle counter 111 passes a signal to the counter and totalizer 122, it passes a signal via lead 121a to the digital comparator 112 to reset the same to zero.

It has been found that in connection with the attenuator 108 which is just before the analog comparator 110 in the output of amplifier 105, the amplitude of the peak of the waveform representing a cycle of operations may vary in amplitude by several volts. To insure that the analog comparator 110 produces a signal each and every time for the same peak output of amplifier 105, the level of signal E from attenuator 108 is reduced further to a predetermined level after accepting the initial peak pulse. Initially, the reference level is set at a high point—95% of the input waveform. After the first pulse is received, the reference level is set to say a level of 60% of the waveform. This allows the output of analog comparator 110 to produce effective pulses even though the form of the input wave from the last peak detector amplifier is changing in amplitude.

While it is more convenient in most cases to connect the transducer across the inlet and outlet orifices of the meter, where it is not convenient, the tubing 18a and 21b may be placed elsewhere in communication with the test gas flowing to and from the meter.

From the analog comparator 110, signals F are fed to a cycle counter 111 and if there are more than one signal F, produced in a cycle of operations without providing for this, the reading of the cycle counter 111 would be false. Therefore, the permit the same test equipment to be used for different makes or sizes of meters, the present invention provides for feeding signals from a digital comparator 112 which prevents more than one signal F per revolution of the valve mechanism from being recorded in the cycle counter 111. For the purpose of permitting the passage of only one of said plurality of signals F to the cycle counter 111, the digital comparator 112 has a manually adjustable knob 113 which can be set by the operator according to the known number of volume controlled signals that are produced in the particular meter being tested in eacy cycle of the meter.

Summarized, the features of this embodiment of our invention which contribute to the efficiency of the method and apparatus disclosed herein result in part from: the measuring of the volume of the test gas passing through the meter during a test run by controlling the rate of flow of the test gas flowing through the meter.

Referring to FIG. 2, the upstream duct 23 and the downstream duct 29 are connected together by a nut 24ascrewed on an enlargement 23a on the duct 23 and having a flange 24b engaging a flange 29a on the downstream duct 29. The nozzle 29b has a flange 29c clamped between a shoulder 23b on the duct 23 and the flange 29a on the duct 29, sealing washers 23c and 23d (or the like) being interposed between the metering surfaces of the respective parts.

The nozzle 29b has a bell-mouth entrance 29c which may be four times the diameter of the throat 29d which opens into a diffusion portion 29e which produces the pressure trap needed to produce sonic flow in the throat controlling the rate of flow of the gas through the meter in the well known manner.

Referring to FIG. 3, the critical flow orifice prover 24e comprises a body in the form of a coupling 24c screw-threaded at one end to receive the threaded end of the duct 23 and at the other end threaded to receive the duct 29. Between the ends of the ducts 23 and 29 the coupling has a transverse wall 24d having an orifice 25e bell-mounted on its upstream side. When the downstream absolute pressure of a stream of gas flowing through the orifice 25e is about one-half the upstream absolute pressure a conditon of critical flow exists and when the latter prevails the volume measured upstream of the orifice does not change with any change in upstream pressure.

The flow rate controller 28 in line with the Open check valve 33 may be similar in construction to the sonic nozzle 24 and the critical orifice 24e.

The apparatus and method of the present invention has been described in connection with the use of the suction pump 38. However it should be understood that any means for flowing air through the meter may be employed. For instance, the air intake duct 43 may be connected to a pump to force test gas through the meter, allowing the test gas to escape into the atmosphere from the manifold 35.

Variations and modificatons may be made within the scope of the claims and portions of the improvements may be used without others.

I claim:

1. The herein described method of proving a positive displacement, diaphragm-operated gas meter having metering mechanism which comprises the steps of causing test gas to flow through said meter at a predetermined constant rate of flow; causing said metering mechanism to operate for a measured time interval to determine the volume of test air which flowed through the meter in a test run and during said test run sensing resultant internal pressure fluctuations of said test gas in the meter which fluctuations are manifested as a family of pressure waves which reoccurs during each cycle of operations of the metering mechanism; converting said pressure waves into a train of electrical signals of varying voltages; amplifying by a first differential amplifier said train of signals, amplifying and feeding said signals to a first peak detector, and passing said detected signals to an attenuator to produce attenuated peak signals; passing said atenuated peak signals and the output of said first peak detector to a second differential amplifier which amplifies the difference between said peak signals from said first differential amplifier and the attenuated peak signals from said first peak detector; feeding the output of said second differential amplifier to a second peak detector and from the latter to a second attenuator, and feeding the output of said second attenuator along with the output of said second differential amplifier to an analog comparator and from the latter to a cycle counter, causing the prover means to operate a clock to product one signal for each predetermined unit of volume of test gas passing through the meter; and feeding said signals to a digital comparator.

2. The method as defined in claim 1 in which a signal from the digital comparator is sent to a cycle counter to enable the latter to pass a signal to a counter and totalizer.

3. In apparatus for use in proving a positive displacement diaphragm-operated gas meter having metering mechanism comprising a fluid pressure transducer responsive to test gas flowing through the meter to sense a train of pressure waves which occur and reoccur in each cycle of operations of the metering mechanism in a test run to produce signals of various voltages, including one or more characteristic peak voltage signals in each train of signals depending on the form of the meter being tested; means for amplifying the signals of each train of signals issuing from said transducers; means for detecting and amplifying said characteristic peak voltage signals; means for shaping said signals; counting means for counting characteristic peak voltage signals occurring in each of said train of signals received in each cycle of operations of the meter, control means for maintaining the rate of flow of test gas passing through the meter during a test run at a constant value and conduit means for connecting said control means and meter for passage of test gas between said control means and the meter, timing means including means for producing a volume-indicating signal in the form of an electric pulse each time a predetermined volume of test gas passes through the meter and means for counting and totalizing said electrical pulses to determine the total volume of test gas which passed through the meter during the test run.

4. In apparatus for use in proving a positive displacement diaphragm-operated gas meter having metering mechanism as defined in claim 3 in which said control means comprises a sonic nozzle.

5. In apparatus for use in proving a positive displacement diaphragm-operated gas meter having metering mechanism as defined in claim 3 in which said control means comprises a critical flow orifice.

6. Apparatus as defined in claim 3 in which there are means for counting the cycles of operation of the metering mechanism and means for terminating the test run after a predetermined number of cycles of operation of the metering mechanism has been counted by said cycle counting means.

7. Apparatus as defined in claim 3 in which there are means for displaying the volume of test gas which has passed through the meter during said test run so that it can be compared with the known volume of test gas which the meter was designed to pass during said predetermined number of cycles of operation of the valve mechanism.

* * * * *

UNITED STATES PATENT AND TRADEMARK OFFICE
CERTIFICATE OF CORRECTION

PATENT NO. : 4,027,523
DATED : June 7, 1977
INVENTOR(S) : Theodore A. St. Clair

It is certified that error appears in the above-identified patent and that said Letters Patent are hereby corrected as shown below:

Column 1, line 27 "or" (second occurrence) should read --for--
         line 36 "in" should read --is--.
Column 4, line 41 "and" should read --to--
         line 52 --each-- should appear after "are".
Column 6, line 53, omit "to" after "T9"
         line 56, "gat" should read --gate--
         line 59, "arangement" should read --arrangement--.
Column 8, line 14 "feed" should read --feet--
         line 15 "provide" should read --prove--
         line 49 "eacy" should read --each--
         line 68 "respective" should read --respectively--.
Column 9, line 32 "eacy" should read --each--.
Column 10, line 46 "the" should read --to--
         line 58 "eacy" should read --each--.
Column 11 (claim 1) line 58 "atenuated" should read --attenuated--.
Column 12 (claim 1) line 6, "product" should read --produce--.

Signed and Sealed this

Sixth Day of September 1977

[SEAL]

Attest:

RUTH C. MASON
Attesting Officer

LUTRELLE F. PARKER
Acting Commissioner of Patents and Trademarks